US008326729B2

(12) United States Patent
Barsade et al.

(10) Patent No.: US 8,326,729 B2
(45) Date of Patent: Dec. 4, 2012

(54) FINANCIAL RISK COVER ANALYSIS, MODELING CONTROL AND MONITORING SYSTEM

(75) Inventors: Jonathan Barsade, Wynnewood, PA (US); John A. Conlon, Riverside, CT (US); Theodore J. Guttierez, Cove Neck, NY (US); Mel J. Meinhardt, Miami, FL (US)

(73) Assignee: Bastgone, LLC, Wynnewood, PA (US)

( * ) Notice: Subject to any disclaimer, the term of this patent is extended or adjusted under 35 U.S.C. 154(b) by 0 days.

(21) Appl. No.: 13/532,123

(22) Filed: Jun. 25, 2012

(65) Prior Publication Data
US 2012/0265709 A1    Oct. 18, 2012

Related U.S. Application Data

(63) Continuation of application No. 12/399,932, filed on Mar. 7, 2009, now Pat. No. 8,224,734.

(51) Int. Cl.
*G06Q 40/00* (2012.01)
(52) U.S. Cl. ........................................................ 705/36
(58) Field of Classification Search ...................... 705/36
See application file for complete search history.

(56) References Cited

U.S. PATENT DOCUMENTS

| | | | |
|---|---|---|---|
| 5,930,762 A | 7/1999 | Masch | |
| 7,113,914 B1 | 9/2006 | Spielmann et al. | |
| 7,149,715 B2 | 12/2006 | Browne et al. | |
| 7,228,290 B2 | 6/2007 | Browne et al. | |
| 7,249,082 B2 | 7/2007 | Menchero | |
| 7,324,978 B2 | 1/2008 | Goldberg et al. | |
| 2002/0147671 A1 | 10/2002 | Sloan et al. | |
| 2004/0249687 A1* | 12/2004 | Lowell et al. | 705/7 |
| 2007/0050282 A1* | 3/2007 | Chen et al. | 705/38 |
| 2009/0043637 A1* | 2/2009 | Eder | 705/10 |
| 2009/0150301 A1* | 6/2009 | Abbott et al. | 705/36 R |
| 2010/0228685 A1 | 9/2010 | Barsade | |

OTHER PUBLICATIONS

Cheng et al., "Latin Hypercube Sampling in Bayesian Networks", Flairs-00 Proceedings, 2000.*
Salby et al., "An Empirical Evaluation of Sampling Methods in Risk Analysis Simulation: Quasi-Monte Carlo, Descriptive Sampling, and Latin Hypercube Sampling", Proceeding of the 2002 Winter Simulation Conference.*
Fogel, D.; "An Introduction to Simulated Evolutionary Optimization", IEEE Transactions on Neural Networks, vol. 5, No. 1, Jan. 1994.

(Continued)

*Primary Examiner* — Charles Kyle
*Assistant Examiner* — Clifford Madamba
(74) *Attorney, Agent, or Firm* — Robert H. Frantz

(57) ABSTRACT

An automatic Financial Risk Cover configuration which receives returns behaviors connecting statistical behavior of each potential allocation of a submanager to a resultant statistical behavior of a Financial Risk Cover associated with a client portfolio, creates a total set of Financial Risk Cover configurations using genetic optimization processes to produce unpredictable variations of configurations, simulates and models each configuration in the total set against a set of potential or expected transient market events representative of a plurality of combinations of transient events, removes from the total set each configuration which fails to meet performance objectives during the modelling from the total set of configurations; and outputs each remaining configuration in the total set, wherein each configuration represents a plurality of investment instruments, each investment instrument being associated with an initial cash position.

21 Claims, 11 Drawing Sheets

OTHER PUBLICATIONS

Hendry, David F.; "A General Forecast-error Taxonomy", Jan. 26, 2000, retrieved on Mar. 10, 2009, from http://fmwww.bc.edu/RePEc/es2000/0608.pdf.

USPTO & Barsade; examination correspondence in related U.S. Appl. No. 12/399,932, filed Mar. 7, 2009, which is currently under notice of allowance.

Cheng et al.; "Latin Hypercube Sampling in Bayesian Networks"; Flairs-00 Proceedings; 2000.

Salby et al.;"An Empirical Evaluation of Sampling Methods in Risk Analysis Simulation: Quasi-Mote Carlo, Descriptive Sampling, and Latin Hypercube SAmpling"; Proceeding of the 2002 Winter Simulation Conference.

* cited by examiner

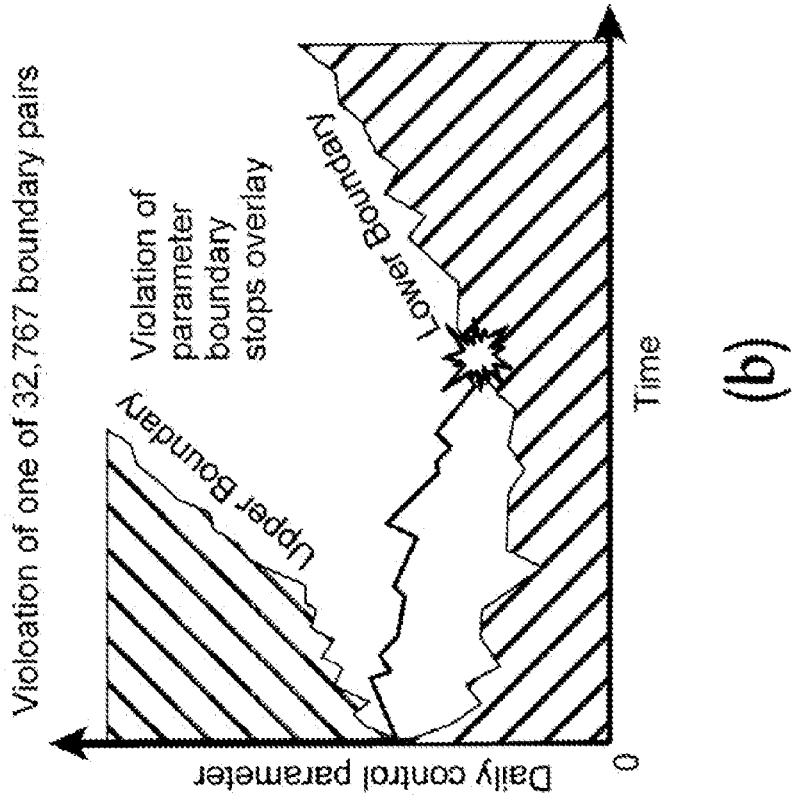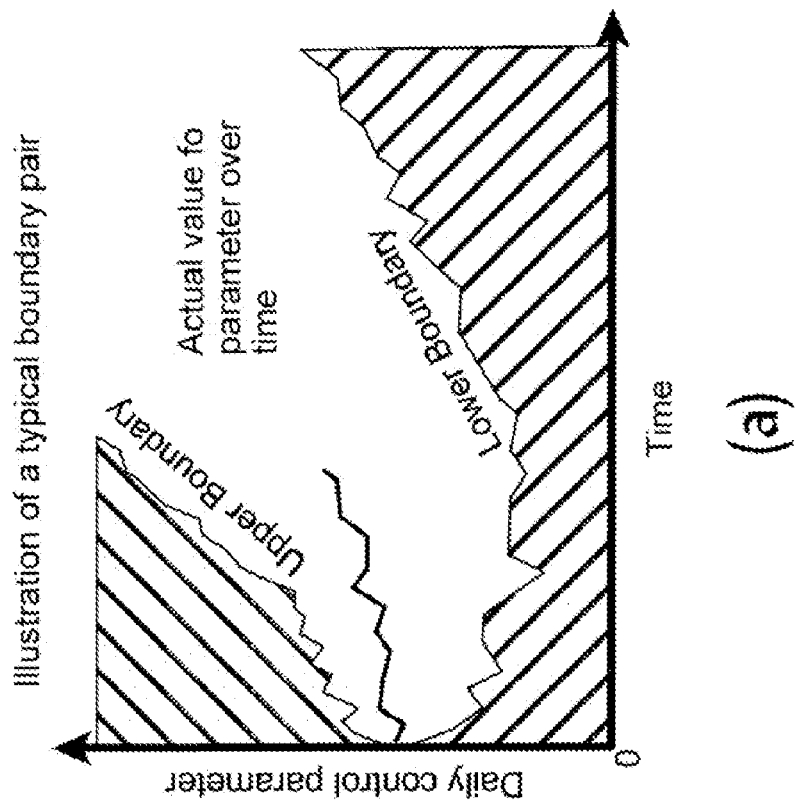
Fig. 7

FINANCIAL RISK COVER ANALYSIS, MODELING CONTROL AND MONITORING SYSTEM

CROSS-REFERENCE TO RELATED APPLICATIONS

Claiming Benefit Under 35 U.S.C. 120

This is a continuation application of U.S. patent application Ser. No. 12/399,932, filed on Mar. 7, 2009, by Jonathan Barsade, which is currently under Notice of Allowance.

FEDERALLY SPONSORED RESEARCH AND DEVELOPMENT STATEMENT

This invention was not developed in conjunction with any Federally sponsored contract.

MICROFICHE APPENDIX

None.

INCORPORATION BY REFERENCE

The related patent application of U.S. patent application Ser. No. 12/399,932, filed on Mar. 7, 2009, by Jonathan Barsade, is hereby incorporated by reference in its entirety.

BACKGROUND OF THE INVENTION

1. Field of the Invention

This is a continuation application of U.S. patent application Ser. No. 12/399,932, filed on Mar. 7, 2009, by Jonathan Barsade, which is currently under Notice of Allowance. This invention relates to data processing systems for managing investment accounts. More particularly, the present invention relates to systems and methods to implement an investment portfolio which covers the risk of transients in a market adverse to a particular investment portfolio.

2. Background of the Invention

Professional investment managers know that even well-designed portfolios can suffer sudden and unexpectedly large losses. Often these situations arise when elements of a portfolio unexpectedly "line up" or become highly correlated in combination with a loss situation.

A Financial Risk Cover (FRC), also referred to simply as a "Cover" in the financial market, is a combination of "futures" and "forwards" (exchange traded financial instruments) which has a specified response to the changing behavior of the portfolio that the Cover is designed to accompany. An FRC is often compared to an "overlay". FRC's are not developed apart from their accompanying "Client" portfolio or "Client" asset.

Some useful definitions for the purposes of this disclosure are:
  (a) futures: Commodities or securities contracted for delivery at a stated future date at a specified price. Such a contract (called futures contract) itself can also be traded. (Source: the Business Dictionary at http:<slash-slash>www<dot>businessdictionary<dot>com)
  (b) forwards: A contract obligating one party to buy and another other party to sell a financial instrument, equity, commodity or currency at a specific future date. (Source: Investor Words Glossary at http:<slash-slash>www<dot>investorwords<dot>com)

At any given moment in time, an FRC can be liquidated for a tangible and useful cash value, as can be a client portfolio of investments with which an FRC is associated.

Traditionally, statisticians have believed that accounting for all possible combinations of transient market behavior in the design of an FRC was impossible or impractical, and therefore their profession has developed numerous methods of accommodating the uncertainties inherent therein.

According to conventional wisdom in the industry, portfolio managers believe that reliance on "trailing measures" of overall FRC performance (e.g., correlations between elements within the FRC and/or external financial measures) can only identify problems with FRC design far too late to effectively avoid problems.

SUMMARY OF THE INVENTION

The present invention includes programmed machines, computers, devices, and processes to provide an automatic Financial Risk Cover configuration which receives returns behaviors connecting statistical behavior of each potential allocation of a submanager to a resultant statistical behavior of a Financial Risk Cover associated with a client portfolio, creates a total set of Financial Risk Cover configurations using genetic optimization processes to produce unpredictable variations of configurations, simulates and models each configuration in the total set against a set of potential or expected transient market events representative of a plurality of combinations of transient events, removes from the total set each configuration which fails to meet performance objectives during the modelling from said total set of configurations; and outputs each remaining configuration in the total set, wherein each configuration represents a plurality of investment instruments, each investment instrument being associated with an initial cash position.

BRIEF DESCRIPTION OF THE DRAWINGS

The following detailed description when taken in conjunction with the figures presented herein provide a complete disclosure of the present invention.

FIG. 7 provides additional illustration regarding boundaries as shown in FIG. 6.

DETAILED DESCRIPTION

As previously mentioned, statisticians have traditionally believed that accounting for all possible combinations of transient market behavior in the design of an FRC was impossible or impractical, and therefore their profession has developed numerous methods of accommodating the uncertainties inherent therein. Our invention employs a fundamentally different approach, accounting for all such combinations relevant to the performance of the FRC.

Figure 1:
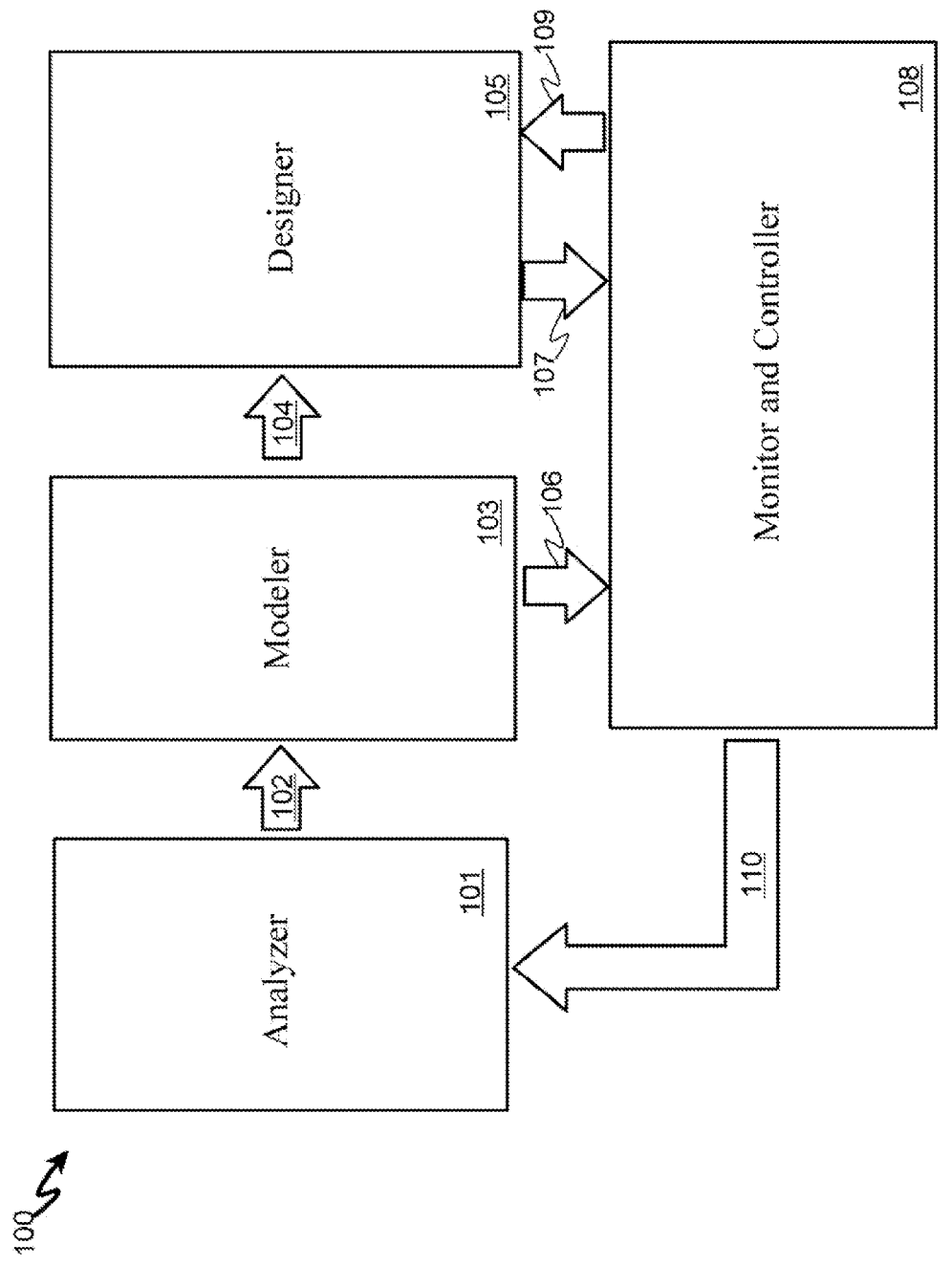
FIG. 1 illustrates a system or process from a top-level according to the present invention.

Turning to FIG. 1, systems and methods (100) according to our invention provide automated analysis (102), modeling (103), and monitoring (108) to automatically design (105) and control (108) of Financial Risk Covers ("FRC") that continue to perform according to pre-determined controls through transient (temporary) and long-term market conditions. Systems embodiments may be segregated into components (101, 103, 105, 108) which are interconnected, communicable, and interoperable (102, 104, 106, 107, 109, 110) with each other, wherein the components may be circuits, machines, programmed processors, or combinations thereof.

Financial Risk Covers. Typical characteristics of a successful FRC are:

(a) according to an FRC's configuration of investments, there is a high conditional probability that, during downward transients in the value of an associated investment portfolio, the FRC will produce an equivalent upward change in value offsetting the associated investment portfolio loss in value, and (b) during periods in which the associated investment portfolio is gaining value, the FRC also gains value, wherein "value" is a net characteristic of a set of investment instruments (associated investment portfolio or FRC configuration) correlated to a cash amount which would be generated at a specific time if sold, redeemed, traded or liquidated.

According to one aspect of systems and methods according to the present invention, controls are automatically defined which permit the operators to predict precisely when the assumptions of the initial FRC configuration begin to erode, preferably prior to violating any design characteristic (e.g., drawdown).

In practice, to realize a configuration of a FRC after automatic determination by a system or method according to the present invention, subcontracted financial managers (submanagers) expert in their niche financial instruments, e.g. exchange traded forwards and futures of the most liquid financial assets, are employed to perform actual purchases and sales of assets within the automatically designed FRC configuration.

Initialization

According to one embodiment, long-term steady-system performance information from managers of long standing real-world operations provides statistical data requirements for successful automated FRC design and control. In this embodiment, each submanager provides daily trading history data for a minimum period of time, such as five year with an average of eight years. In such a five-year history, more than 37,000 daily data points are utilized to establish a baseline of precision and the relationships of a given submanager to himself, to other submanagers and to various markets through a complete set of transient market conditions. These "cross-relationships", and the way each changes through transients and over time (temporal relationships), define the assumptions used by systems and methods according to the present invention.

Modeling

Figure 3:
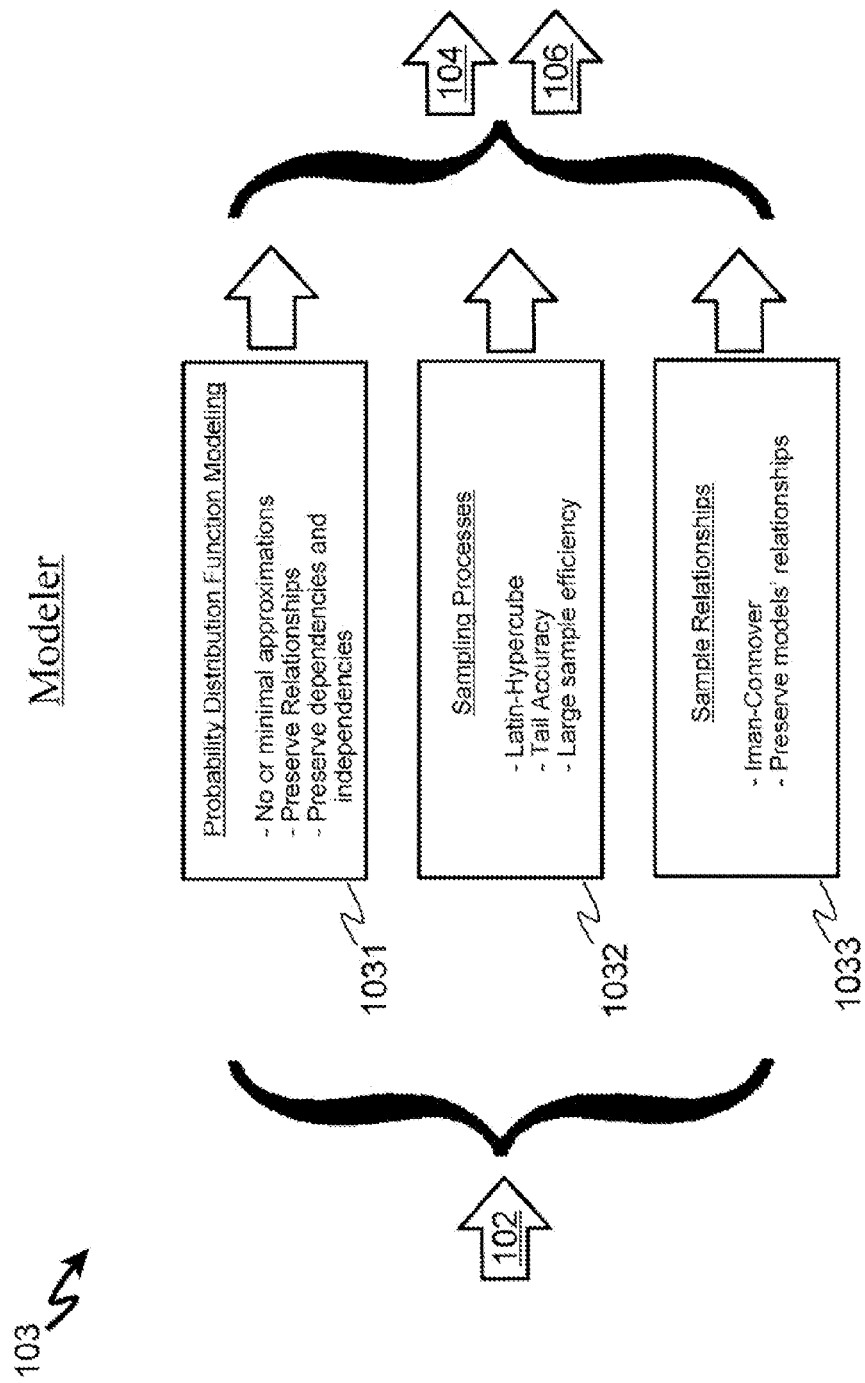
FIG. 3 provides details of a modeler according to the present invention.

Turning to FIG. 3, details of a modeler (103) according to the present invention are shown. Near zero tolerance for measurement error is possible by systems and methods according to the present invention by automatically predicting each potential FRC configuration behavior through simulation of very low probability events perhaps not yet observed in real-world markets yet.

To complete these predictions:

(a) Systems and methods according to the present invention use extensive quantitative processes to model (1031) the returns behavior of each submanager, which is explicitly different than even the best conventional statistical approximations of submanager results. The present processes preserve the cross relationships and temporal relationships of each submanager and all combinations of submanagers. As stated above, systems and methods according to the present invention establish and utilize the conditional probability described elsewhere within this description.

(b) Systems and methods according to the present invention perform advanced sampling processes (1032) specifically designed for efficient modeling of very low-probability events (e.g., Latin-hypercube sampling).

(c) And, systems and methods according to the present invention perform leading edge sample data generation methods (1033) that preserve the relationships, independence and dependence between each modeled behavior (e.g., Iman-Connover based methods).

FRC Designer

Figure 4:
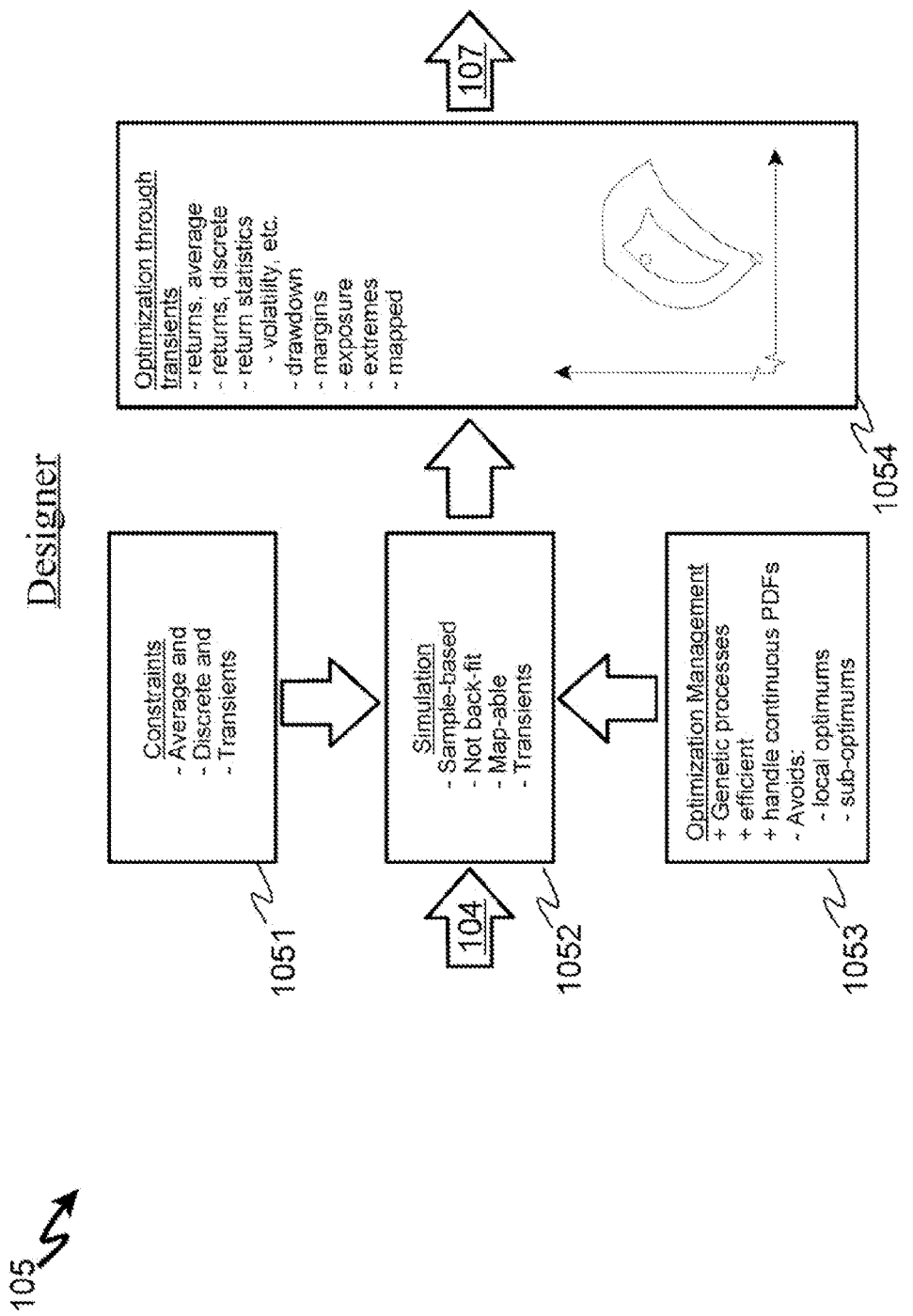
FIG. 4 illustrates an automated designer of financial risk covers according to the present invention.

Turning to FIG. 4, systems and methods according to the present invention automatically design (105) a plurality of FRC create configurations for FRC's that focus on avoiding unacceptable transient results by considering and mapping a total set of configurations which are representative of essentially all possible FRC designs, by simulating (1052) and modelling each configuration in the total set of FRC configurations against a set of possible transient market events (1054) which are representative of essentially all combinations of transient events, determining which of the modelled FRC configurations fail to meet performance objectives during the modelling, by removing from the total set of FRC configurations those configurations which failed to meet performance objectives when modelled against the set of possible transient market events, and by declaring the remaining set of FRC configurations as a set of optimized FRC configurations, which when their contained assets and financial instruments are held over a period of time and then converted to cash value, would be predicted to produce acceptable transient results (e.g., daily drawdown limits) while en route production of steady value gains during other periods.

Systems and methods according to the present invention use several internal methods to achieve these operational characteristics through:

a. use of efficient genetic optimization processes (1053) that exploit the sample processes described elsewhere in this description;

b. use of constraints (1051) that include limits on transient behaviors and very low probability events; and c. avoidance of "back-fit" solutions or models that make macro-economic assumptions.

Monitor and Controller

Traditionally, portfolio managers have believed that reliance on "trailing measures" of overall FRC performance can only identify problems with FRC design far too late to effectively avoid problems. Systems and methods according to the present invention, however, leverage the precision of the present modeling processes, coupled with use of considerable computational power, to create preset boundaries for all possible combinations of acceptable submanager behavior. In the past, statisticians have believed that accounting for all possible combinations of transient behavior was impossible or impractical, and therefore their profession has developed numerous methods of accommodating the uncertainties inherent therein.

Systems and methods according to the present invention, however, take a fundamentally different approach which does account for all such combinations. Systems and methods according to the present invention, are able to create a very large set of independent daily boundaries, typically about 32,000 unique daily boundary pairs for each FRC. Mathematically stated, the number of boundary pairs is $2^n-1$, where n is the number of submanagers involved in managing a particular FRC.

Taken together, these boundaries define the ranges of FRC behavior responsive to market transients that will achieve the desired risk-offsetting of the FRC configuration. Calculation of these boundaries for a single FRC typically in practice may require about two weeks of calculation time by computers dedicated exclusively to that task. Reducing the duration of the calculation is a further benefit of some embodiments of systems and methods according to the present invention, however, the two week number cited is, in some instances, an operationally significant threshold where requiring more than two weeks to complete may be operationally useless without incurring significant costs and loss of operational flexibility.

Figure 5:
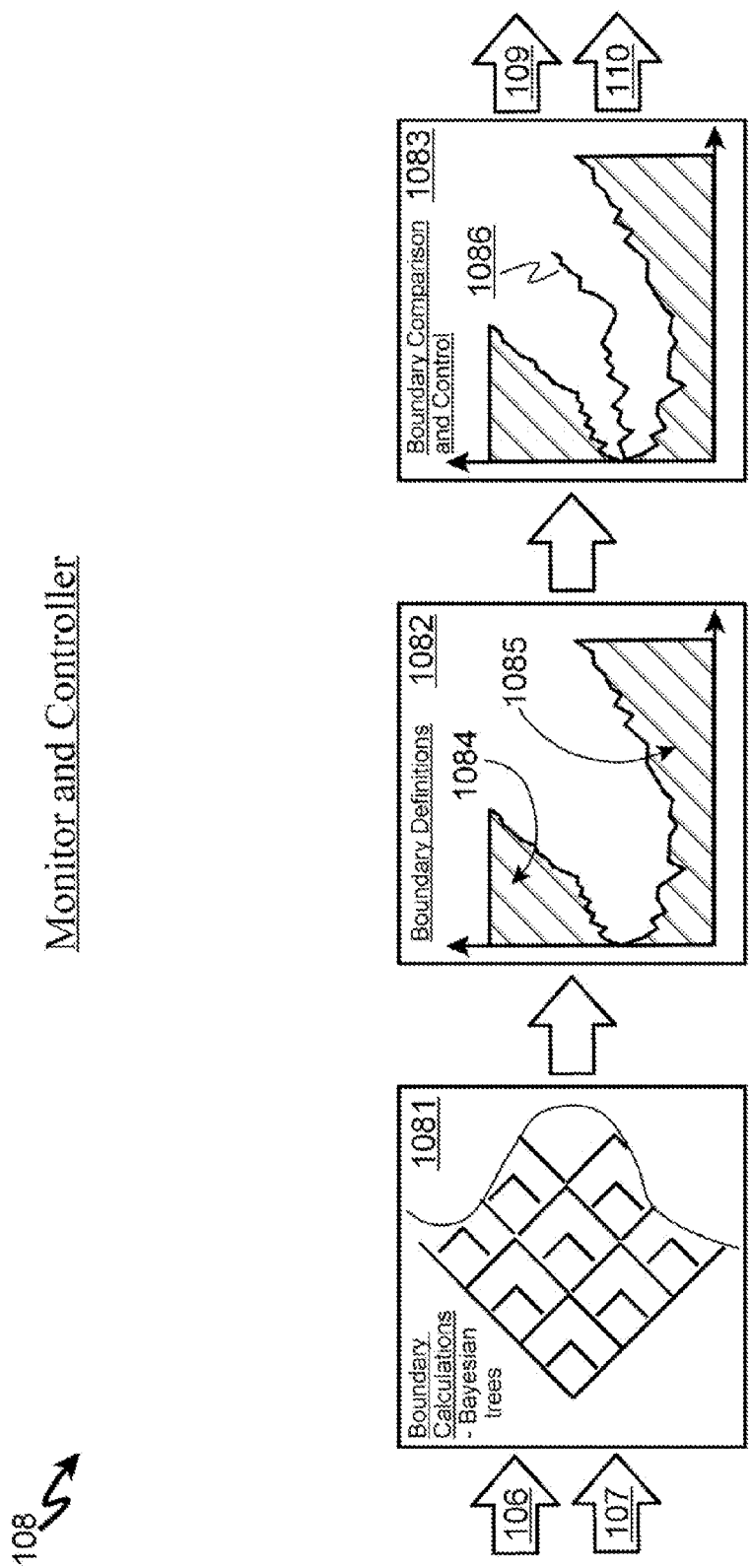
FIG. 5 shows details of a monitor and controller for financial risk covers according to the present invention.

Turning to FIG. 5, a monitor and controller (108) according to the present invention is shown. First, a plurality of boundary conditions are calculated (1081), such as by using Bayesian trees. These boundary conditions (1082) have pairs of upper limits (1084) and lower limits (1085), between which a particular performance parameter is monitored (1083) as it performs or is measured (1086) on a periodic basis, such as on a daily basis.

Systems and methods according to the present invention employ a unique combination of controls that helps ensure each FRC avoids losses due to transient market conditions, including:

(a) rapid-response controls identify and prevent precarious situations that arise in a single day;
(b) systemic avoidance measures which exploit market characteristics to avoid sudden shifts;
(c) mid-term controls which perform both quantitative and qualitative systems to identify approaching undesirable correlation and help ensure predictable behavior; and
(d) long-term controls which provide independence and objectivity in the system.

If a performance parameter (1086) enters the upper or lower boudary areas (1084, 1085), certain control actions are taken to redesign the FRC, which are described elsewhere in this disclosure.

Selection of Submanagers

FRC's are designed by systems and methods according to the present invention using extremely precise models of submanager rates of return. These models describe each individual submanager's return pattern, and the acceptable behavior patterns of each and every possible combination of submanagers within an FRC. The present automated processes employ advanced sampling processes to develop the best possible, optimized risk FRC for each individual client. Initial Cover designs minimizes risk of loss by planning for both expected and rare changes in Cover value, and setting the initial Cover parameters well within a margin of safety.

According to one embodiment of a system or method according to the present invention, only submanagers are selected who have demonstrated more than five years of daily conformance to a pre-determined performance standard to be included in a custom designed FRC. Each submanager, as well as every combination of submanagers, is subjected to the rigorous analysis, modeling and design processes described herein to yield an FRC configuration that will account for and survive untoward market transients. In these particular embodiments, exceptionally few submanagers may meet the criteria for internal risk control and predictability relative to the peer submanagers in the group.

Initial FRC Design

Figure 6:
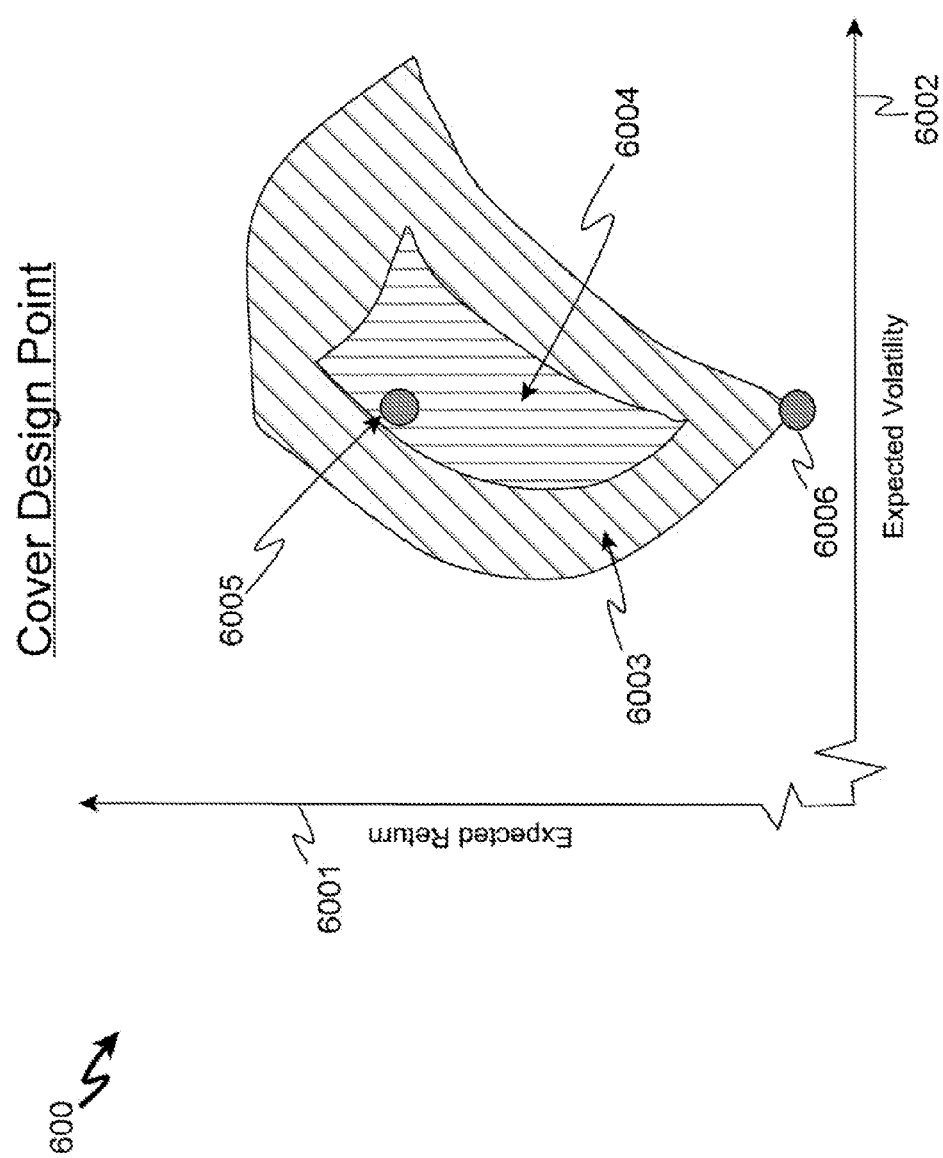
FIG. 6 illustrates two parameters of many which are used to establish boundaries of performance for a financial risk cover according to the present invention.

Rapid and mid-term control systems are made possible by the unique combination of analysis and modeling of the elements that form an FRC according to the present invention. Unlike portfolio designs that may be optimized to maximize absolute return, the FRC's primary design focus is on loss avoidance and volatility reduction. In FIG. 6 is an illustration that simplifies the FRC design by displaying a partial set of the dimensions used in the FRC design. In this simplified diagram, an initial client portfolio volatility and return point (6006) is allowed to move over time within an area (6003) bounded by possibly design parameters which meet the client's objectives. According to the present invention, the FRC's design and control parameters are configured to stay within an performance area (6004) which is wholly within the client objective area (6003), the space between the outer client objective area (6003) and outer edges of the FRC performance area (6004) is a response control margin. At any given time, an overlay design point (6005) exists representing the current volatility versus expected return of the FRC.

In practice, actual FRC designs are bounded by spaces with about eleven dimensions, only two of which are illustrated here in order to allow depiction on a flat, static (e.g. non-animated, non-interactive) drawing.

Early Erosion Detection

Systems and methods according to the present invention include an FRC control system which identifies erosion of the FRC's behavior prior to the onset of any real or tangible unacceptable value losses, in enough advance notice to control it and change it to meet client objectives.

An output of systems and methods according to the present invention is a set of pre-defined hair-trigger boundaries that remain in effect only as long as the FRC configuration and its assumptions remain valid, typically about 30 days. In the course of daily trading activity by the FRC's submanagers, systems and methods according to the present invention update the analysis to determine if any single combination of boundaries is violated by real-world conditions of the FRC (and it's components). Responsive to determining that a combination of boundaries are violated, the FRC is immediately terminated, and an automatice redesign is initiated to meet the owner's or client's objectives.

These hair-trigger "violations" occur well before, oftentimes many days before, the FRC as a whole has a chance to fail, and as such, this aspect of systems and methods according to the present invention is very useful. This is true both during "steady-state" conditions (e.g. relatively non-transient) and during severe market transient conditions. Through automatic early detection of the erosion of an FRC's performance prior to violation of any design characteristic, actual losses through FRC performance are reduced, and automatic redesign provides a new FRC to allow continued meeting of client or owner objectives.

Rapid-Response Controls

According to another aspect of an embodiment of systems and methods according to the present invention, the positions of all FRC elements are checked daily against their respective boundary conditions. An "FRC element" consists of each possible combination of single and multiple submanagers that are present within a designed FRC. In a typical FRC using 15 submanagers, there are 32,767 possible combinations (elements) limited by 65,534 boundaries. Each boundary has a predetermined different value each day, depending upon the history of that element. The values of these boundaries and FRC elements incorporate the returns of each submanager, their histories, the correlations between submanagers and the designed risk profile of the Cover.

Using modelling according to the present invention, the limits are precisely defined for acceptable FRC element behavior. "Acceptable element behavior" is a precise prediction of combinations of daily returns that together form predetermined boundary conditions. FIG. 7(a) provides an illustration of a boundary pair according to the processes of the present invention. Upper and lower boundaries are established prior to FRC execution and are based on the precise and inter-related distribution functions of the submanagers selected for a given FRC. The number of control boundaries for a given FRC is described by 2*(2n−1), where n is the number of submanagers within the design of the FRC.

As long as an FRC element's daily return results (shown as the plot between the two boundaries in combinations with its history of results) falls within these upper and lower boundary conditions, the assumptions on which the FRC was designed are held to be true by the processes according to the present invention.

If an FRC element's daily return results equal or exceed these limits, as shown in FIG. 7(b), the assumptions are held to have been violated by processes according to the present invention. In those cases, the violating element is removed expeditiously from the FRC before the element can harm the entire FRC. This avoids unnecessary loss. Violation of a parameter boundary does not imply loss of Cover value. If trading is stopped for a boundary violation, the submanagers have ready recourse to a variety of alternatives to resume trading the following day.

Because Covers employ only fully liquid submanagers that are able to immediately exit their trading markets without penalty, full control can be exercised on a daily basis without sacrificing performance through use of a system or method according to the present invention. Submanagers whose trading systems enter and exit markets at differing points in a given market transient may also be chosen. Using this information further minimizes the possibility of FRC elements reaching their boundaries.

Systemic Avoidance Measures

FRC's are dominated by highly liquid positions in slow moving markets. For example, a particular FRC may include positions in G-7 denominated currencies (perhaps 50% of the FRC), government bonds (perhaps 25% of the FRC), major equity index futures (perhaps 10% of the FRC) and a small allocation of highly traded metals and energy contracts. Other FRC's may employ different mixtures, as this example is for illustrative purposes only. The invention, of course, is operable and useful for FRC's of various configurations, not just the illustrative example provided here.

Notably these markets are characterized by orderly price movements, and the reasons for such characteristics are well documented. Because FRC's use these markets, the inherent chance of sudden large shifts in FRC value is negligible.

Over the counter derivatives undergo periods of risk during which either the instrument is not liquid, or its value uncertain. FRC's typically do not include positions in these instruments. Equity markets—even the largest and most stable—are infamously susceptible to sudden large shifts in value. FRC's, or this reason, also almost never contain positions in equities.

Mid-Term Controls

According to another aspect of systems and methods according to the present invention, the FRC is monitored for subtle shifts in submanager behavior that may portend more significant erosion in the assumptions that underlie each FRC. Such shifts may occur with an individual submanager or with a combination of submanagers.

Quantitative Controls

According to another aspect of systems and methods according to the present invention, several independent systems are employed to monitor for shifts in the return and correlation patterns of each submanager and in combinations of submanagers. These processes exploit the precision return pattern estimates that are made possible through the unique analysis systems described elsewhere in this disclosure.

Typically, some fairly rapid changes in portfolio element behavior do not immediately threaten to violate a boundary condition. These shifts can occur over several days. To identify these approaching conditions, systems and methods according to the present invention track the values of first order derivatives of select FRC element parameters. Chief among the focus is the rate of change with respect to time of the statistical and correlation matrix values.

Sometimes slow changes can, over time, accumulate to create threatening correlation conditions. Typically these subtle shifts occur over a period of weeks. Systems and methods according to the present invention identify these shifts by monitoring absolute variations in values of correlation and statistics for individual submanagers and combinations of submanagers.

Long-Term Independence

Separate from its other operations and monitoring systems, systems and methods according to the present invention check for biases that may be introduced into its operations and analyses. These independent checks help ensure systems, methods and operations maintain the standards and disciplines required to consistently identify and avoid risks.

Method to Create an FRC

FRC portfolios result from a process having four phases:
(1) preparation;
(2) optimization;
(3) analysis; and
(4) recommendation.

The preparation phase identifies and selects potential submanager participants from among thousands of candidates, analyzes their performance through detailed statistical studies, and quantitatively defines the client's objectives. The optimization phase creates, evaluates and optimizes the enormous number of possible combinations of submanagers in a manner that best meets the client's goals. The analysis phase evaluates the optimization results vis-á-vis the initial objectives, identifies further options for improvements and recommends a best possible solution.

Preparation

In practice, it is recommended that a user of system or method according to the present invention continuously seek out and evaluate many thousands of professional portfolio managers to identify those few who meet the rigorous but atypical criteria. In particular, systems and methods according to the present invention perform well with submanagers whose return and volatility statistics are consistent relative to other submanagers (irrespective of absolute return), but in uncorrelated or mutually negatively correlated ways. Further selection criteria limit a submanager's possible inclusion in an FRC. For example, the liquidity of the underlying assets, the value of equity under management and the submanager's operating history must all meet select criteria.

Figure 2:
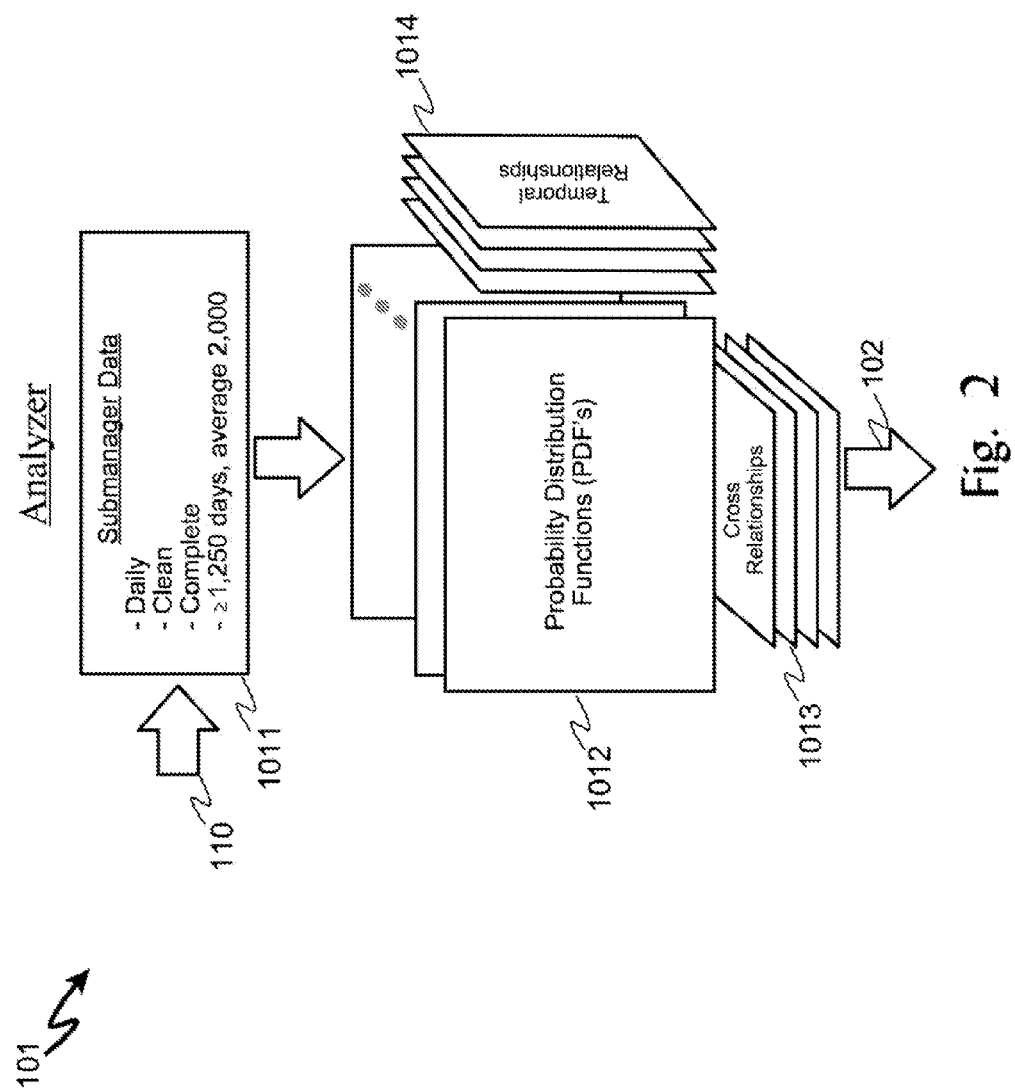
FIG. 2 depicts details of an analyzer according to the present invention.

As shown in FIG. 2, after a much reduced set of potential submanagers is identified, the performance data (110) of each submanager is analyzed in detail. Particularly important are the daily performance statistics relative to each other potential submanager within the submanager pool, and similar statistics relative to the major security, bond and currency indices. For each submanager who meets the criteria according to the method of the invention, detailed probability distribution functions (1012) are created that describe each submanager portfolio performance relative to (1) every other submanager portfolio, (2) every major index, and (3) the client's portfolio. Dynamic statistical matrices (1013, 1014) are developed to connect the statistical behavior of each submanager's possible allocation in an FRC to the resultant statistical behavior of the combined FRC and client portfolio.

Client portfolio data is analyzed in the same manner as submanager data. Detailed probability distribution functions are created that describe the client portfolio relative to every submanager portfolio and relative to all appropriate indices.

The combined portfolio objectives are systematically quantified, and conditions are specified under which the portfolio will operate. Together these objectives, constraints, preferences and conditions form a set of precise FRC specifications.

Optimization

Each FRC is constructed from about one hundred million possible combinations of qualified submanagers. Each of these possible combinations has several thousand additional variations. The optimization phase (1054 in FIG. 4) selects the best combination of submanagers from among these many possibilities.

To identify and analyze the best overall combination of portfolio submanagers from this large set of possibilities, systems and methods according to the present invention employ a family of analytic processes known as genetic processes and combines these with advanced statistical processes that account for the uncertainty in both the submanagers' and the client portfolio's performance.

Genetic optimization processes are inherently stronger and more flexible than portfolio optimization processes that use linear processes or related processes. The specialized dynamic statistical matrices connect the genetic processes to the uncertainty statistics. The genetic processes are able to effectively and reliably assess non-linear behavior in the inputs' variables and constraints. They are able to function through discontinuous conditions and avoid the problems of sub- or local-optimization inherent in linear solution processes. In particular, the invention's use of genetic processes also incorporate the real-world uncertainties and probabilistic characteristics of variables—characteristics which are often ignored by other optimization processes.

According to the present invention, genetic processes create, evaluate and improve combinations of FRC submanager participants that best reach the client's objectives. These objectives typically include maximizing the return-to-volatility ratio, minimizing overall volatility, minimizing drawdown, etc.

The Initial FRC

The probability distribution functions for each submanager and the client portfolio are used to automatically create an initial FRC, e.g. a first hypothetical combined portfolio. The dynamic statistical matrices connect the mathematical properties of the combined portfolio elements so that their probability distribution functions' statistical properties continue to behave predictably—relative to each other—irrespective of the future external market conditions to which they are exposed.

Simulation of the Initial FRC

The resultant hypothetical portfolio is subjected to thousands of pseudo-random simulations of client portfolio and FRC behavior through simulation (1052). In one embodiment according to the present invention, a Latin Hypercube process is employed to ensure potential outlier combinations are fully examined in the simulations. Other processes optimize the use of computer processing power to ensure a sufficient number of potential portfolios are mapped so that no "gaps" exist, while concentrating computing power on the combinations that are likely to be most successful.

From these simulations, the performance characteristics of the initial hypothetical portfolio are calculated (e.g., return, volatility, uncertainty, information ratio, etc.)

Subsequent FRC Genetic Variations

Systems and methods according to the present invention systematically continue to create, evaluate and improve combinations of FRCs beyond the initial FRC, whereas the initial FRC often does not meet all performance criteria as detected during the simulations. In practice, many thousands of FRC genetic variations may be created simulated in this phase. Systems and methods according to the present invention subject each FRC genetic variation and client portfolio to the simulation process described regarding simulation of the initial FRC. As each simulation is completed, it is checked for performance to objectives, and if it meets the analysis criteria, its results are "mapped" onto a multidimensional field of results. Other processes optimize the use of computer processing power to ensure a sufficient number of potential portfolios are mapped so that no "gaps" exist, while concentrating computing power on the combinations that are likely to be most successful.

Analysis of this field of FRC genetic variations ultimately allows systems and methods according to the invention to determine the best—and most reliable—combination of submanagers for the FRC.

Analysis

After completing this first optimization pass on typically including creation of, simulation and qualification of several thousand genetic variations, systems and methods according to the present invention repeat the process with additional analyses to identify optimal portfolio combinations that balance client objectives and constraints, and explore possible solutions beyond the specified constraints.

(a) Sensitivity. Systems and methods according to the invention perform a variety of sensitivity analyses that identify those factors that are likely to have the greatest effect on meeting client objectives. Such analyses permit development of FRC strategies that minimize the potential downsides of portfolio behavior.

(b) Objectives. Each client's objectives are unique and varied. The optimization approach of the present invention frequently permits analysis of "what-if" scenarios that alter objectives. Such analyses often provide insights into the theoretical and practical limits of a strategy, and thereby help managers decide on appropriate resource allocations to pursue alternate strategies.

Figure 8:
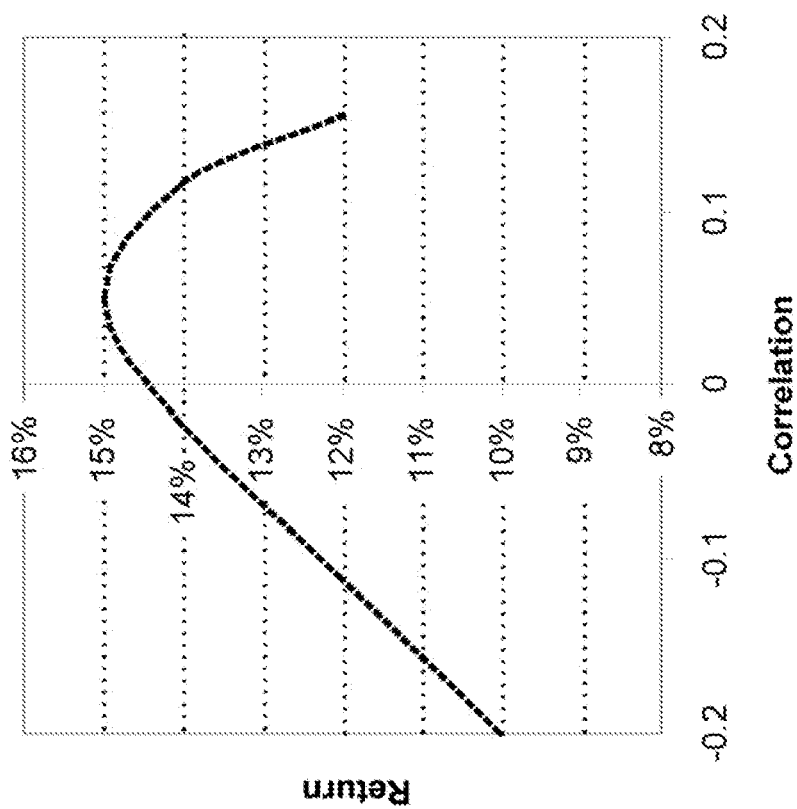
FIG. 8 depicts a typical return versus correlation plot relative to a financial risk cover according to the present invention.

(c) Constraints. Possible solutions for conditions outside the original specifications are optionally examined. For example, as illustrated in FIG. 8, if the correlation coefficient between the client portfolio and a particular FRC is specified to be −0.10, the effect this specification has on other client objectives (e.g., return, volatility) is optionally analyzed. After so doing, incremental strategies can be developed that could, for example, result in substantial increases in rate of return for negligible changes in volatility.

(d) Stress. Computational processes employed by the invention permit close examination of cases in which sequences of individually rare outcomes all coincide. These cases can be handled and analyzed with the same statistical rigor applied to each base case.

(e) Outliers. The combination of genetic processes and statistical analyses of the present invention permits close identification of rare combinations of events, estimation of the likelihood of those events and the potential consequences of those rare events. As appropriate, steps can be taken to offset the risks such outlier events may pose.

Recommendation

A firm's analyses, using a system or method according to the present invention, often can result in further discussion and fine-tuning with clients. In these cases, portions or all of the optimization processes are sometimes repeated to meet and refine the Cover and better meet client objectives.

Following acceptance of such a firm's recommendation by the client, the designed FRC is implemented through directing, monitoring, auditing and evaluating each participating submanager. Continuous monitoring (108) of each submanager, the client's portfolio, and periodic re-optimization help ensure the client's objectives are met and potential downsides avoided.

Suitable Genetic Processes

Historically speaking, genetic processes originated from the studies of similarities between animals and machines in the mid 1970s, led by research at the University of Michigan, the US Naval Research Labs and the US Advanced Research Projects Agency (ARPA). Through the 1980s, the research in genetic processes was mainly theoretical with few practical applications. As the theoretical understanding of genetic processes—and the ability to implement their complex operations—improved, practical applications developed. Early applications included computational protein engineering (e.g., predicting an amino acid's properties) and control of robots in changing environments. Today some of the leading-edge commercial projects that incorporate genetic processes include complex scheduling and logistics management. For example, it has been reported that Proctor and Gamble hopes to have a genetic process-based logistics system in place by 2008. The past few years have seen a rapid expansion of research and development into genetic process-based approaches to problems in optimization, scheduling, data fitting and clustering, and path finding.

As additional applications are developed, each gives a new perspective to the earlier theories. Furthermore, in the process of improving performance by tuning and customizing the genetic process operators, new and important findings regarding the generality, robustness and applicability of genetic processes became available.

Generally speaking a genetic process is a computer model which derives its behavior from a metaphor of the processes of evolution in nature. Within software a population of individuals represented by chromosomes is created; in essence a set of characteristics that are analogous to the chromosomes that are seen in human DNA. The individuals in the population then go through a process of evolution which includes the principles of mutation and selection.

With genetic processes, elements or chunks of elements are swapped between individuals as if by sexual combination and reproduction (crossover). Others are changed at random (mutation). New generations appear from clones of the current population, in proportion to their fitness: a single objective function of the parameters that returns a numerical value, to distinguish between good and bad solutions. Fitness is then used to apply selection pressure to the population in a 'Darwinian' fashion (survival of the fittest). Genetic processes differ from traditional (non-genetic) optimization and search procedures in several ways:

(1) genetic processes work with a coding of the parameter set, not the parameters themselves;

(2) genetic processes search from a population of points, not from a single point;

(3) genetic processes use payoff (objective function) information, not derivatives or other auxiliary knowledge; and (4) genetic processes use probabilistic transition rules, not deterministic rules.

Those skilled in the art may select one or more suitable genetic processes to vary the FRC configurations as described herein to achieve a system or method according to the present invention.

Other Suitable Methods and Processes

Latin Hypercube sampling is a recent development in sampling technology designed to accurately recreate input distributions through sampling in fewer iterations than Monte Carlo methods. The process "sampling without replacement" also helps ensure low probability outcome events are thoroughly examined and simulated.

Non-Gaussian distribution function models are far better at describing the probabilistic outcomes of real-world financial markets and securities than the "normal distribution" model assumptions used by classic portfolio management theory. Recently developed statistical processes now permit these more accurate models to be used in combination with other quantitative sampling and computation methods.

Suitable Computing Platform

Figure 9A:
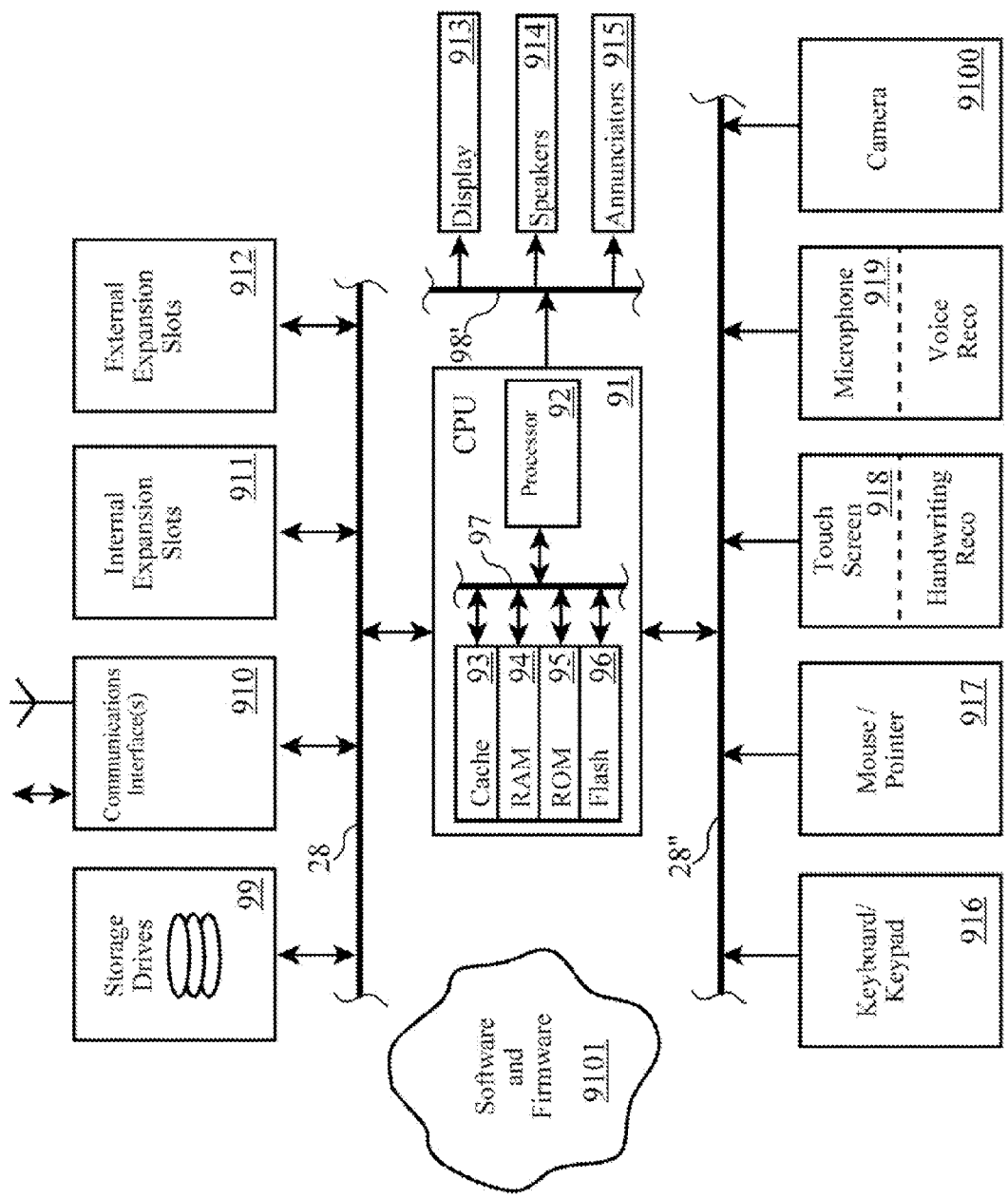
FIGS. 9a and 9b show a generalized computing platform architecture, and a generalized organization of software and firmware of such a computing platform architecture.
Figure 9B:
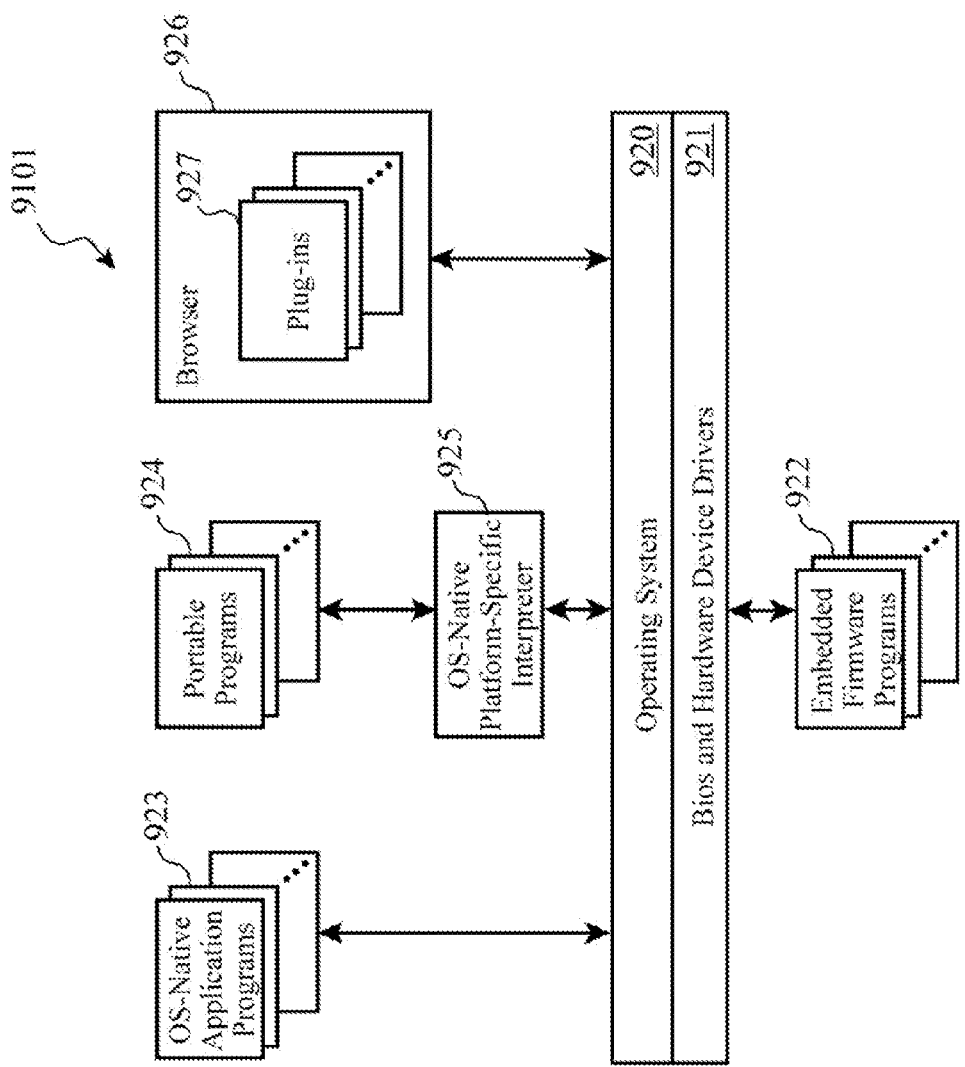

FIGS. 9a and 9b show a generalized computing platform architecture, and a generalized organization of software and firmware of such a computing platform architecture.

The invention is preferably realized as a feature or addition to the software already found present on well-known computing platforms such as personal computers, web servers, and web browsers. These common computing platforms can include personal computers as well as portable computing platforms, such as personal digital assistants ("PDA"), web-enabled wireless telephones, and other types of personal information management ("PIM") devices.

Therefore, it is useful to review a generalized architecture of a computing platform which may span the range of implementation, from a high-end web or enterprise server platform, to a personal computer, to a portable PDA or web-enabled wireless phone.

Turning to FIG. 9a, a generalized architecture is presented including a central processing unit (91) ("CPU"), which is typically comprised of a microprocessor (92) associated with computer memories, such as but not limited to random access memory ("RAM") (94) and read-only memory ("ROM") (95). Often, the CPU (91) is also provided with cache memory (93) and programmable FlashROM (96). The interface (97) between the microprocessor (92) and the various types of CPU memory is often referred to as a "local bus", but also may be a more generic or industry standard bus.

Many computing platforms are also provided with one or more storage drives (99), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (910), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (911), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (912) allowing the user the ability to easily install and remove hardware expansion devices, such as PCMCIA cards, SmartMedia cards, and various proprietary modules such as removable hard drives, CD drives, and floppy drives.

Often, the storage drives (99), communication interfaces (910), internal expansion slots (911) and external expansion slots (912) are interconnected with the CPU (91) via a standard or industry open bus architecture (98), such as ISA, EISA, or PCI. In many cases, the bus (98) may be of a proprietary design.

A computing platform is usually provided with one or more user input devices, such as a keyboard or a keypad (916), and mouse or pointer device (917), and/or a touch-screen display (918). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (918) is usually provided, often with handwriting recognition capabilities.

Additionally, a microphone (919), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (9100), such as a still digital camera or full motion video digital camera.

One or more user output devices, such as a display (913), are also provided with most computing platforms. The display (913) may take many forms, including a Cathode Ray Tube ("CRT"), a Thin Flat Transistor ("TFT") array, or a simple set of light emitting diodes ("LED") or liquid crystal display ("LCD") indicators.

One or more speakers (914) and/or annunciators (915) are often associated with computing platforms, too. The speakers (914) may be used to reproduce audio and music, such as the speaker of a wireless telephone or the speakers of a personal computer. Annunciators (915) may take the form of simple beep emitters or buzzers, commonly found on certain devices such as PDAs and PIMs.

These user input and output devices may be directly interconnected (98', 98") to the CPU (91) via a proprietary bus structure and/or interfaces, or they may be interconnected through one or more industry open buses such as ISA, EISA, PCI, etc. The computing platform is also provided with one or more software and firmware (9101) programs to implement the desired functionality of the computing platforms.

Turning to now FIG. 9b, more detail is given of a generalized organization of software and firmware (9101) on this range of computing platforms. One or more operating system ("OS") native application programs (923) may be provided on the computing platform, such as word processors, spreadsheets, contact management utilities, address book, calendar, email client, presentation, financial and bookkeeping programs.

Additionally, one or more "portable" or device-independent programs (924) may be provided, which must be interpreted by an OS-native platform-specific interpreter (925), such as Java™ scripts and programs.

Often, computing platforms are also provided with a form of web browser or micro-browser (926), which may also include one or more extensions to the browser such as browser plug-ins (927).

The computing device is often provided with an operating system (920), such as Microsoft Windows™, UNIX, IBM OS/2™, IBM AIX™, open source LINUX, Apple's MAC OS™, or other platform specific operating systems. Smaller devices such as PDA's and wireless telephones may be equipped with other forms of operating systems such as realtime operating systems ("RTOS") or Palm Computing's PalmOS™.

A set of basic input and output functions ("BIOS") and hardware device drivers (921) are often provided to allow the operating system (920) and programs to interface to and control the specific hardware functions provided with the computing platform.

Additionally, one or more embedded firmware programs (922) are commonly provided with many computing platforms, which are executed by onboard or "embedded" microprocessors as part of the peripheral device, such as a micro controller or a hard drive, a communication processor, network interface card, or sound or graphics card.

As such, FIGS. 9a and 9b describe in a general sense the various hardware components, software and firmware programs of a wide variety of computing platforms, including but not limited to personal computers, PDAs, PIMs, web-enabled telephones, and other appliances such as WebTV™ units. Disclosure of the present invention herein is made relative to the processes and methods preferably implemented as software and firmware on such a computing platform. It will be readily recognized by those skilled in the art that the following methods and processes may be alternatively realized as hardware functions, such as circuitry, in part or in whole, without departing from the spirit and scope of the invention.

Computer Readable Memories

In one embodiment of the invention, logical processes according to the invention and described herein are encoded on or in one or more computer-readable memories. Some computer-readable memories are read-only (e.g. they must be initially programmed using a different device than that which is ultimately used to read the data from the media), some are write-only (e.g. from a the data encoders perspective they can only be encoded, but not read simultaneously), and some are read-write. Still some other memories are write-once, read-many-times.

Some memories are relatively fixed in their mounting mechanisms, while others are removable, or even transmittable. Computer-readable memories generally form two types of systems when encoded with data and/or computer software: (a) when removed from a drive or reading mechanism, they are memory devices which generate useful data-driven outputs when stimulated with appropriate electromagnetic, electronic, and/or optical signals; and (b) when installed in a drive or reading device, they form a data repository system accessible by a computer.

Figure 10:
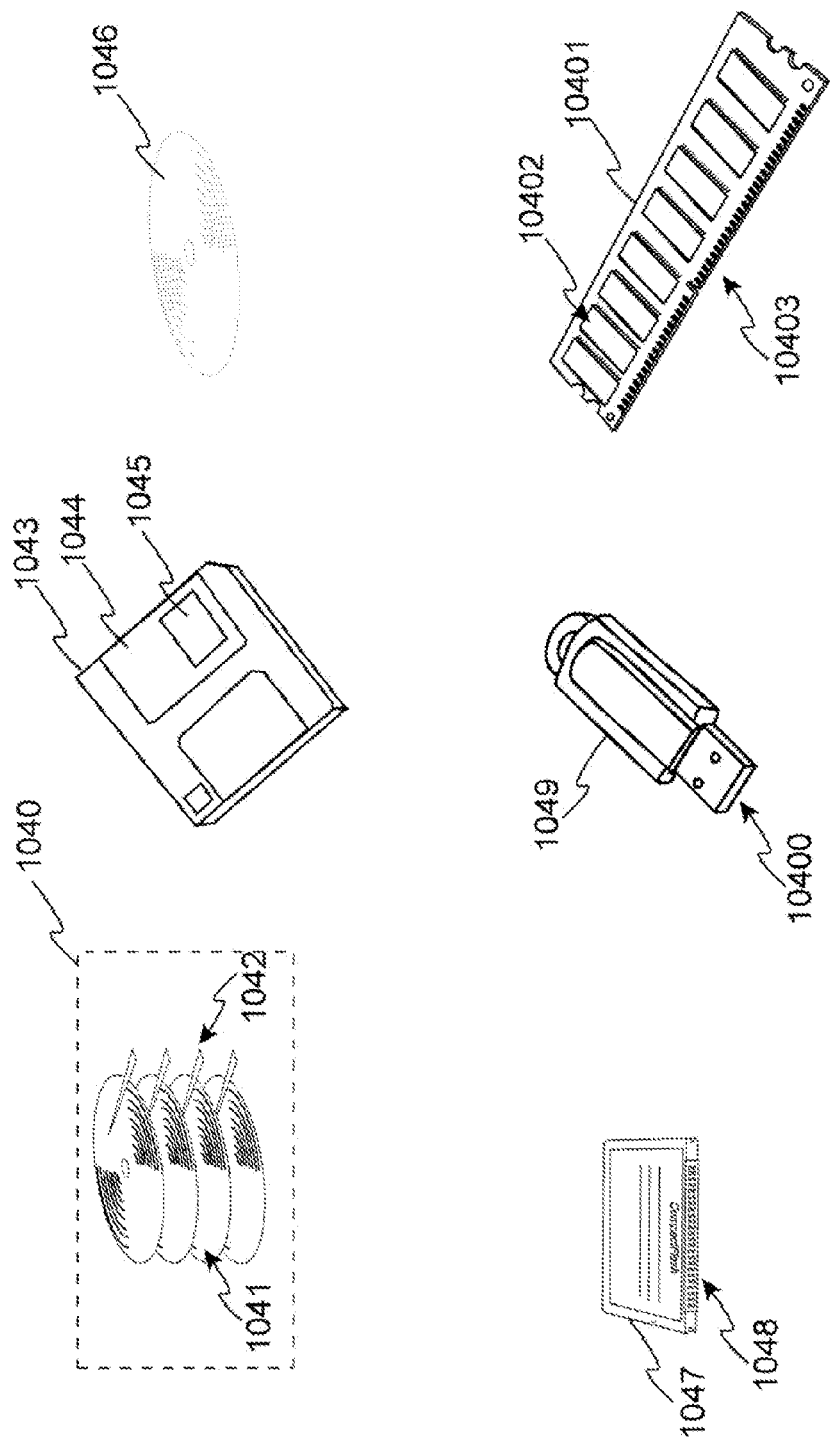
FIG. 10 illustrates computer readable memories of various removable and fixed types.

FIG. 10 illustrates some computer readable memories including a computer hard drive (1040) having one or more magnetically encoded platters or disks (1041), which may be read, written, or both, by one or more heads (1042). Such hard drives are typically semi-permanently mounted into a complete drive unit, which may then be integrated into a configurable computer system such as a Personal Computer, Server Computer, or the like.

Similarly, another form of computer readable memories is a flexible, removable "floppy disk" (1043), which is inserted into a drive which houses an access head. The floppy disk typically includes a flexible, magnetically encodable disk which is accessible by the drive head through a window (1045) in a sliding cover (1044).

A Compact Disk ("CD") (1046) is usually a plastic disk which is encoded using an optical and/or magneto-optical process, and then is read using generally an optical process. Some CD's are read-only ("CD-ROM"), and are mass produced prior to distribution and use by reading-types of drives. Other CD's are writable (e.g. "CD-RW", "CD-R"), either once or many time. Digital Versatile Disks ("DVD") are advanced versions of CD's which often include double-sided encoding of data, and even multiple layer encoding of data. Like a floppy disk, a CD or DVD is a removable media.

Other common types of removable memories are several types of removable circuit-based (e.g. solid state) memory devices, such as Compact Flash ("CF") (47), Secure Data™ ("SD"), Sony's MemoryStick™, Universal Serial Bus ("USB") FlashDrives and "Thumbdrives" (49), and others. These devices are typically plastic housings which incorporate a digital memory chip, such as a battery-backed random access chip ("RAM"), or a Flash Read-Only Memory ("FlashROM"). Available to the external portion of the media is one or more electronic connectors (1048, 10400) for engaging a connector, such as a CF drive slot or a USB slot. Devices such as a USB FlashDrive are accessed using a serial data methodology, where other devices such as the CF are accessed using a parallel methodology. These devices often offer faster access times than disk-based media, as well as increased reliablity and decreased susceptibility to mechanical shock and vibration. Often, they provide less storage capability than comparably priced disk-based media.

Yet another type of computer readable media device is a memory module (10403), often referred to as a SIMM or DIMM. Similar to the CF, SD, and FlashDrives, these modules incorporate one or more memory devices (10402), such as Dynamic RAM ("DRAM"), mounted on a circuit board (10401) having one or more electronic connectors for engaging and interfacing to another circuit, such as a Personal Computer motherboard. These types of memory modules are not usually encased in an outer housing, as they are intended for installation by trained technicians, and are generally protected by a larger outer housing such as a Personal Computer chassis.

In these manners, various embodiments of the invention may be realized by encoding software, data, or both, according to the logical processes of the invention, into one or more computer-readable memories, thereby yielding a product of manufacture and a system which, when properly read, received, or decoded, yields useful programming instructions, data, or both, including, but not limited to, the computer-readable memories types described in the foregoing paragraphs.

CONCLUSION

The present invention may be realized in a variety of forms, programming languages, methodologies, and operating systems on a variety of computing platforms without departure from the spirit and scope of the present invention. A number of example embodiment details have been disclosed as well as optional aspects of the present invention in order to illustrate the invention, but which do not define the scope of the invention. Therefore, the scope of the present invention should be determined by the following claims.

We claim:

1. A system for financial risk cover analysis, modeling, monitoring and control comprising:
   a computer having a processor;
   a set creator portion of the computer for creating a set of alternative Financial Risk Cover configurations in a tangible computer readable storage memory device by employing a genetic optimization process to produce a set of unpredictable alternative Financial Risk Cover configurations as variations of a previously-designed Financial Risk Cover configuration;
   a simulator portion of the computer for modeling the variation Financial Risk Cover configurations against a plurality of transient market events;
   a set modifier portion of the computer for removing each alternative Financial Risk Cover configuration which fails to meet performance objectives during the modeling; and
   a monitor/controller portion of the computer for:
      monitoring actual performance of a Financial Risk Cover by measuring one or more performance parameters, and
      responsive to a performance parameter being outside a boundary condition, updating the set of alternative Financial Risk Cover configurations by repeating the modelling and removing.

2. The system as set forth in claim 1 further comprising:
   a receiver for receiving the previously-designed Financial Risk Cover into a tangible, computer readable storage memory device, wherein the previously-designed Financial Risk Cover comprises at least returns behaviors including probability distribution functions and dynamic statistical matrices connecting statistical behavior of each potential allocation of a Financial Risk Cover submanager to a resultant statistical behavior of a Financial Risk Cover associated with a client portfolio;
   an output portion of the computer for outputting into a tangible, computer-readable storage memory device each alternative Financial Risk Cover configuration in the set, wherein each alternative Financial Risk Cover configuration represents a plurality of investment instruments, each investment instrument being associated with an initial cash position; and
   wherein the monitor/controller portion is further for calculating a plurality of boundary conditions having pairs of upper limits and lower limits.

3. The system as set forth in claim 2 wherein the analyzer is for analyzing performance data reflecting daily performance statistics relative to each other potential submanager within the plurality of submanagers.

4. The system as set forth in claim 2 wherein the probability distribution functions further comprise one or more additional probability distribution functions selected from the group consisting of submanager portfolio performances relative to each other submanager portfolio, submanager portfolio performances relative to a plurality of major indices, and submanager portfolio performances relative to the client portfolio.

5. The system as set forth in claim 1 wherein the modeler further comprises a Latin-Hypercube sampling process.

6. The system as set forth in claim 1 wherein the modeler comprises a Iman-Connover sampling process.

7. The system as set forth in claim 1 wherein the calculation of boundary conditions comprises a Bayesian trees process.

8. A method for financial risk cover analysis, modeling, monitoring and control comprising:
   creating by a computer a set of alternative Financial Risk Cover configurations in a tangible computer readable storage memory device by employing a genetic optimization process to produce a set of unpredictable alternative Financial Risk Cover configurations as variations of a previously-designed Financial Risk Cover configuration;
   modeling by a computer the variation Financial Risk Cover configurations against a plurality of transient market events;
   removing by a computer each alternative Financial Risk Cover configuration which fails to meet performance objectives during the modeling;
   monitoring by a computer actual performance of a Financial Risk Cover by measuring one or more performance parameters, and
   responsive to a performance parameter being outside a boundary condition, updating by a computer the set of alternative Financial Risk Cover configurations by repeating the modelling and removing.

9. The method as set forth in claim 8 further comprising:
   receiving the previously-designed Financial Risk Cover into a tangible, computer readable storage memory device, wherein the previously-designed Financial Risk Cover comprises at least returns behaviors including probability distribution functions and dynamic statistical matrices connecting statistical behavior of each potential allocation of a Financial Risk Cover submanager to a resultant statistical behavior of a Financial Risk Cover associated with a client portfolio; and
   outputting into a tangible, computer-readable storage memory device each alternative Financial Risk Cover configuration in the set, wherein each alternative Financial Risk Cover configuration represents a plurality of investment instruments, each investment instrument being associated with an initial cash position; and
   wherein the monitoring further comprises calculating a plurality of boundary conditions having pairs of upper limits and lower limits.

10. The method as set forth in claim 9 wherein the monitoring further comprises analyzing performance data reflecting daily performance statistics relative to each other potential submanager within the plurality of submanagers.

11. The method as set forth in claim 9 wherein the probability distribution functions comprise at least one probability distribution function selected from the group consisting of submanager portfolio performances relative to each other submanager portfolio, submanager portfolio performances relative to a plurality of major indices, and submanager portfolio performances relative to the client portfolio.

12. The method as set forth in claim 8 wherein the modeling comprises a Latin-Hypercube sampling process.

13. The method as set forth in claim 8 wherein the modeling comprises a Iman-Connover sampling process.

14. The method as set forth in claim 8 wherein the calculation of boundary conditions comprises a Bayesian trees process.

15. A computer program product for financial risk cover analysis, modeling, monitoring and control comprising:
   at least one computer readable storage memory device;
   first program instructions for creating by a computer a set of alternative Financial Risk Cover configurations in a tangible computer readable storage memory device by employing a genetic optimization process to produce a set of unpredictable alternative Financial Risk Cover configurations as variations of a previously-designed Financial Risk Cover configuration;
   second program instructions for modeling by a computer the variation Financial Risk Cover configurations against a plurality of transient market events;
   third program instructions for removing by a computer each alternative Financial Risk Cover configuration which fails to meet performance objectives during the modeling;
   fourth program instructions for monitoring by a computer actual performance of a Financial Risk Cover by measuring one or more performance parameters, and
   fifth program instructions, for responsive to a performance parameter being outside a boundary condition, updating by a computer the set of alternative Financial Risk Cover configurations by repeating the modelling and removing;
   wherein the first, second, third, fourth, and fifth program instructions are stored by, in or on the computer readable storage memory device.

16. The computer program product as set forth in claim 15 further comprising:
   sixth program instructions for receiving the previously-designed Financial Risk Cover into a tangible, computer readable storage memory device, wherein the previously-designed Financial Risk Cover comprises at least returns behaviors including probability distribution functions and dynamic statistical matrices connecting statistical behavior of each potential allocation of a Financial Risk Cover submanager to a resultant statistical behavior of a Financial Risk Cover associated with a client portfolio; and
   seventh program instructions for outputting into a tangible, computer-readable storage memory device each alternative Financial Risk Cover configuration in the set, wherein each alternative Financial Risk Cover configuration represents a plurality of investment instruments, each investment instrument being associated with an initial cash position;
   wherein the program instructions for monitoring further comprise program instructions for calculating a plurality of boundary conditions having pairs of upper limits and lower limits; and
   wherein the sixth and seventh program instructions are stored by, in or on the computer readable storage memory device.

17. The computer program product as set forth in claim 16 wherein the program instructions for monitoring further comprise programs instructions for analyzing performance data reflecting daily performance statistics relative to each other potential submanager within the plurality of submanagers.

18. The computer program product as set forth in claim 16 wherein the probability distribution functions comprise at least one submanager portfolio performance selected from the group consisting of submanager portfolio performances relative to each other submanager portfolio, submanager portfolio performances relative to a plurality of major indices, and submanager portfolio performances relative to the client portfolio.

19. The computer program product as set forth in claim 15 wherein the modeling comprises a Latin-Hypercube sampling process.

20. The computer program product as set forth in claim 15 wherein the modeling comprises a Iman-Connover sampling process.

21. The computer program product as set forth in claim 15 wherein the program instructions for calculation of a boundary condition comprises a Bayesian trees process.

* * * * *